(12) United States Patent
Isomura et al.

(10) Patent No.: US 9,498,807 B2
(45) Date of Patent: Nov. 22, 2016

(54) HEAT TREATMENT METHOD, HEAT-TREATING FURNACE, AND HEAT TREATMENT SYSTEM

(71) Applicants: Keisuke Isomura, Kariya (JP); Shinya Mizuno, Nagoya (JP); Noriyuki Ueno, Toyota (JP); Takehito Kobayashi, Chiryu (JP)

(72) Inventors: Keisuke Isomura, Kariya (JP); Shinya Mizuno, Nagoya (JP); Noriyuki Ueno, Toyota (JP); Takehito Kobayashi, Chiryu (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 175 days.

(21) Appl. No.: 14/405,975

(22) PCT Filed: Jun. 4, 2013

(86) PCT No.: PCT/IB2013/001262
§ 371 (c)(1),
(2) Date: Dec. 5, 2014

(87) PCT Pub. No.: WO2013/182897
PCT Pub. Date: Dec. 12, 2013

(65) Prior Publication Data
US 2015/0147709 A1    May 28, 2015

(30) Foreign Application Priority Data
Jun. 8, 2012 (JP) .................. 2012-130608

(51) Int. Cl.
*H01M 10/54* (2006.01)
*B09B 3/00* (2006.01)
*F27B 17/00* (2006.01)
*F27D 7/02* (2006.01)
*F27D 21/04* (2006.01)

(52) U.S. Cl.
CPC .......... *B09B 3/0091* (2013.01); *B09B 3/0083* (2013.01); *F27B 17/00* (2013.01); *F27B 17/0016* (2013.01); *F27D 7/02* (2013.01); *F27D 21/04* (2013.01)

(58) Field of Classification Search
CPC ............................ H01M 10/54; B23K 1/015
USPC ................ 432/29, 85, 90, 91, 197, 198, 210
See application file for complete search history.

(56) References Cited

U.S. PATENT DOCUMENTS 4,194,297 A * 3/1980 Pfahl, Jr. ............... B23K 1/015
                                                   165/104.12
4,561,347 A   12/1985 Zaitu
(Continued)

FOREIGN PATENT DOCUMENTS

CN    101442121 A    5/2009
JP    59-224661 A    12/1984
(Continued)

*Primary Examiner* — Gregory A Wilson
(74) *Attorney, Agent, or Firm* — Andrews Kurth Kenyon LLP

(57) ABSTRACT

A work is subjected to a heat treatment in a heat-treating furnace. First, the work is carried into the heat-treating furnace. The work in the heat-treating furnace is immersed in a heat source solvent. In the heat-treating furnace, a superheated steam atmosphere is formed. The work is exposed in the heat-treating furnace under the superheated steam atmosphere. Then, the work is carried out of the heat-treating furnace.

14 Claims, 3 Drawing Sheets

(56) References Cited

U.S. PATENT DOCUMENTS

| | | | |
|---|---|---|---|
| 5,735,933 A | 4/1998 | Yokoyama et al. | |
| 2001/0030386 A1* | 10/2001 | Garidel | B23K 1/015 264/347 |
| 2004/0134575 A1 | 7/2004 | Ninomiya | |
| 2009/0095631 A1* | 4/2009 | Kamo | H01M 4/242 204/554 |
| 2014/0017621 A1* | 1/2014 | Iida | C22B 1/005 432/13 |

FOREIGN PATENT DOCUMENTS

| | | |
|---|---|---|
| JP | 62-186775 A | 8/1987 |
| JP | H08-41554 A | 2/1996 |
| JP | 2004-143486 A | 5/2004 |
| JP | 3552118 B2 | 8/2004 |
| JP | 2005-201479 A | 7/2005 |
| JP | 2009-273996 A | 11/2009 |
| JP | 2011-111511 A | 6/2011 |

* cited by examiner

HEAT TREATMENT METHOD, HEAT-TREATING FURNACE, AND HEAT TREATMENT SYSTEM

CROSS-REFERENCE TO RELATED APPLICATIONS

This is a national phase application based on the PCT International Patent Application No. PCT/IB2013/001262 filed Jun. 4, 2013, claiming priority to Japanese Patent Application No. 2012-130608 filed Jun. 8, 2012, the entire contents of both of which are incorporated herein by reference.

BACKGROUND OF THE INVENTION

1. Field of the Invention

The invention relates to a heat treatment method, a heat-treating furnace, and a heat treatment system.

2. Description of Related Art

Conventionally, various proposals have been made about a method of subjecting a work to a heat treatment and a heat treatment device. For example, in Japanese Patent Application Publication No. 62-186775 (JP62-186775 A), there is proposed a hot water heating device that introduces hot water from a hot water tank into a treatment tank so as to subject an object to a homogeneous heat treatment, for the purpose of cooking/sterilizing food and the like. Besides, in Japanese Patent Application Publication No. 08-41554 (JP08-41554 A), there is disclosed a treatment method for a waste battery. In this treatment method, the waste battery is introduced into a sealed heat-treating furnace. Then, the heat-treating furnace is sucked and exhausted while being heated. Thus, the waste battery is rendered in a non-oxidative state. After that, a non-oxidative gas is supplied into the heat-treating furnace through pressurization to rapidly and homogeneously heat the waste battery to a predetermined temperature. In Japanese Patent Application Publication No. 2004-143486 (JP2004-143486 A), there is described a method of rapidly heating and rapidly cooling a non-ferrous metal alloy through the use of liquid metal Na. Besides, in Japanese Patent Application Publication No. 2005-201479 (JP2005-201479 A), there is described a method in which a slug containing chrome oxides is immersed in warm water to remove hexavalent chromium.

Besides, in Japanese Patent Application Publication No. 2009-273996 (JP2009-273996 A), there is disclosed a method of forming a pressurized reduced atmosphere with a view to decomposing PCB and various kinds of dioxin. In this method, a sealed container retaining pollutants and moisture therein is heated, so that the interior of the container is filled with superheated steam to form a pressurized reduced atmosphere. Besides, in Japanese Patent Application Publication No. 2011-111511 (JP2011-111511 A), there is disclosed a regeneration treatment system that replaces air in a heat-treating furnace with superheated steam, and throws a raw material containing carbon compounds and a catalyst as well as a superheated steam into the heat-treating furnace to subject the carbon compounds to a regeneration treatment.

Nowadays, there have been demands for the development of heat treatment technologies for reducing a environmental burden. As a method of reducing the environmental burden, it is important to seek to achieve the enhancement of treatment efficiency.

SUMMARY OF THE INVENTION

The invention provides a heat treatment method, a heat-treating furnace, and a heat treatment system. More specifically, the invention provides a heat treatment method, a heat-treating furnace, and a heat treatment system, each of which subjects a work to a heat treatment under a superheated steam atmosphere.

A heat treatment method according to a first aspect of the invention is a heat treatment method for subjecting a work to a heat treatment in a heat-treating furnace. The heat treatment method includes carrying the work into the heat-treating furnace, immersing the work in the heat-treating furnace in a heat source solvent, forming a superheated steam atmosphere in the heat-treating furnace, exposing the work in the heat-treating furnace under the superheated steam atmosphere, and carrying the work out of the heat-treating furnace.

A heat-treating furnace according to a second aspect of the invention is a heat-treating furnace for subjecting a work to a heat treatment. The heat-treating furnace includes a housing, a heating unit, an exhaust port, and a solvent control unit. The housing is configured to accommodate the work and is equipped with a space that is configured to seal a gas. The heating unit is configured to form a superheated steam atmosphere in the space. The exhaust port is configured to discharge a gas present in the space from the housing. The solvent control unit is configured to immerse the work in a heat source solvent and expose, when the space is the superheated steam atmosphere, the work from the heat source solvent.

A heat treatment system according to a third aspect of the invention includes a heat-treating furnace, an out-of-furnace tank, and a solvent supply device. The heat-treating furnace includes a housing, a solvent storage tank, and a steam generation heater. The housing is configured to accommodate a work. The solvent storage tank is configured to store a heat source solvent containing water. The steam generation heater is configured to heat the heat source solvent stored in the solvent storage tank to generate steam in the housing. The out-of-furnace tank is provided outside the heat-treating furnace and is connected to the solvent storage tank by a flow channel. The solvent supply device is configured to move the heat source solvent between the out-of-furnace tank and the solvent storage tank via the flow channel to immerse the work in the heat source solvent or expose the work from the heat source solvent.

According to the aspects of the invention, there are provided a heat treatment method, a heat-treating furnace, and a heat treatment system that achieve the enhancement of treatment efficiency and reduce an environmental burden.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
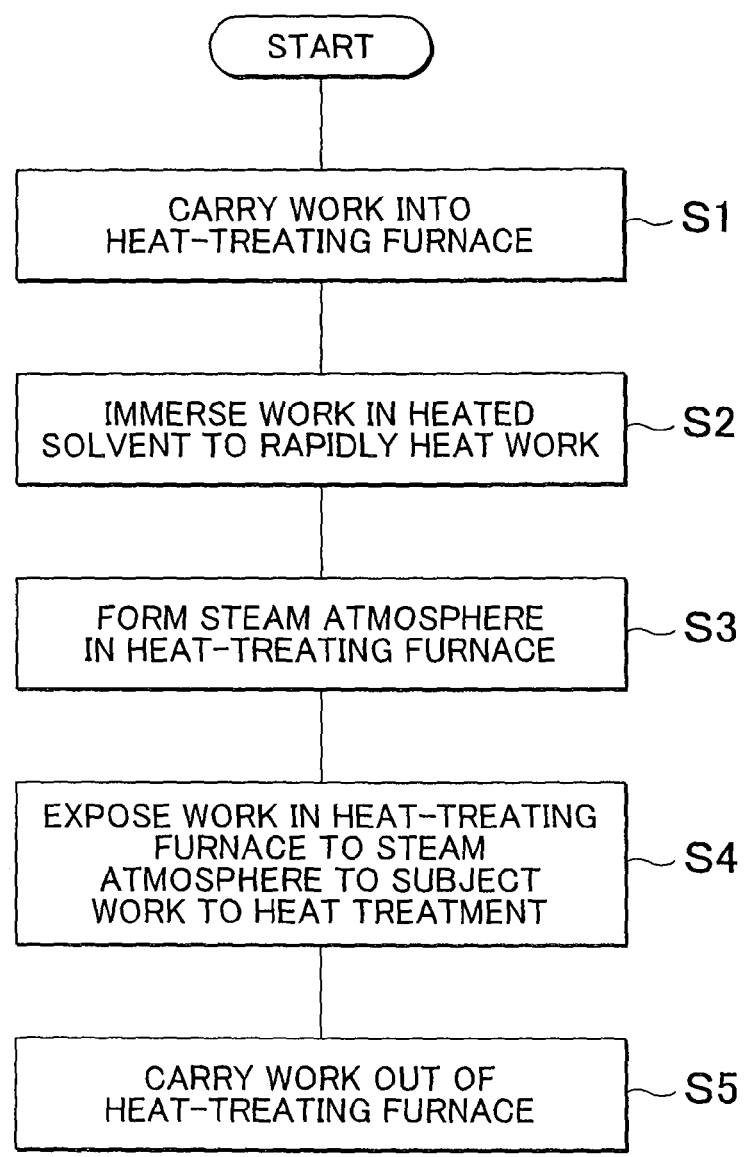
FIG. 1 is a flowchart for explaining a heat treatment method according to this embodiment of the invention.

An exemplary embodiment of the invention will be described hereinafter. Incidentally, other embodiments can also pertain to the scope of the invention as long as they match the gist of the invention. Besides, the size and ratio of respective members in the following drawings are set for the convenience of explanation, and are different from those of real members. Besides, like components are denoted by like reference symbols respectively, and the description thereof is omitted when appropriate.

A heat treatment method according to the embodiment of the invention relates to a method of subjecting a work to a heat treatment in a heat-treating furnace, and is constituted by at least the following steps S1 to S5. Namely, the heat treatment method according to the embodiment of the invention has a carrying-in process (step S1), an immersion heating process (step S2), a superheated steam-ization step (step S3), a heat treatment process (step S4), and a carrying-out process (step S5). In the carrying-in process, the work as an object to be treated is carried into the heat-treating furnace. In the immersion heating process, the work in the heat-treating furnace is immersed in a heat source solvent. In the superheated steam-ization process, a superheated steam atmosphere is formed in the heat-treating furnace. In the heat treatment process, the work is exposed under the superheated steam atmosphere to be subjected to the heat treatment. In the carrying-out process, the work is carried out of the heat-treating furnace.

The heat treatment method according to the embodiment of the invention may generally be applied to purposes intended to subject a work to a heat treatment under a superheated steam atmosphere without subjecting the work to a combustion treatment. In particular, the embodiment of the invention is suited for a non-combustion-type heat treatment including flammable substances, because of a heat treatment in an anoxic state. For example, the embodiment of the invention may be applied to the detoxification or the like of various kinds of batteries and electronic components.

The process of carrying the work into the heat-treating furnace in step S 1 is not limited in particular, and a known method may be utilized without limitation. For example, it is possible to mention a method of automatically carrying the work into the heat-treating furnace by a robot arm or the like. Alternatively, it is possible to mention a method of accommodating the work in a dedicated case such as a reticulate case or the like and carrying the reticulate case into the heat-treating furnace through automatic control.

The process of immersing and heating the work in step S2 is not limited in particular, and a known method may be utilized without limitation. In step S2, the work in the heat-treating furnace is immersed in the heat source solvent. The type of the heat source solvent is not limited in particular as long as it does not depart from the gist of the invention. However, the heat source solvent is preferably water, or a solvent containing water. If these solvents are used, they can also be utilized as a steam generation source in step S3, and reduction in size of the device and efficiency enhancement are achieved. The heat source solvent may also be a solution or dispersion liquid to which an additive such as salt or the like has been added. Incidentally, "the heat source solvent" means a solvent (solution) at a temperature that is equal to or lower than its boiling point and sufficient to rapidly heat the work. In the case where water is used as the solvent, the temperature is equal to or higher than, for example, 80° C. From the standpoint of rapidly heating the work more effectively, the temperature is preferably equal to or higher than 90° C., and is more preferably equal to or higher than 95° C.

In step S2, the work is immersed in the heat source solvent. Thus, the work can be more efficiently raised in temperature than in the case where the work is heated together with the solvent at room temperature. Besides, the work can be more efficiently raised in temperature than in the case where the process of step S2 is omitted to directly throw the work under a steam atmosphere in step S3. Namely, by heating the work via the solvent, the work can be efficiently raised in temperature with enhanced thermal conduction efficiency. Incidentally, step S1 and step S2 are permutable. Namely, after a suitable amount of the heated solvent is injected into the heat-treating furnace, the work may be carried into the heat-treating furnace to be immersed in the solvent.

After the work is immersed in the heat source solvent, a superheated steam atmosphere is formed in the heat-treating furnace in step S3. More specifically, the heat-treating furnace is filled with superheated steam while being sealed up. Furthermore, the gas in the heat-treating furnace is sucked and discharged to fill the interior of the heat-treating furnace with superheated steam. Thus, an anoxic state is established in the heat-treating furnace. The heat source solvent is preferably used as a steam source. Namely, it is preferable to use water or a solvent containing water as the heat source solvent, and further apply heat to the heat source solvent to thereby generate steam. The steam is efficiently generated through the use of the heated heat source solvent. As a matter of course, it is appropriate to use a heat source solvent of a nonaqueous system, and separately provide a steam source. Alternatively, it is appropriate to adopt a configuration in which water or a solvent containing water is used as the heat source solvent and also a separate steam source is provided. Incidentally, step S2 and step S3 may be executed at the same time. Namely, while the work is immersed in the heat source solvent to be heated, a superheated steam atmosphere may be formed in the heat-treating furnace.

Subsequently in step S4, the work is exposed from the heat source solvent and subjected to a heat treatment under the superheated steam atmosphere. The gas and the like generated from the work are sucked from the exhaust port according to need. Incidentally, a normal pressure is preferred in the heat-treating furnace. However, a positive pressure or a negative pressure may also be formed in the heat-treating furnace.

In step S5, the work is carried out of the heat-treating furnace. The method of carrying out the work is not limited in particular, and a known method may be utilized without limitation. A process of cooling the work may be added prior to step S5. It is preferable to immerse the work in the heat source solvent used in step S2, lower the temperature of the work, and then carry out the work.

As a method of subjecting the work to the heat treatment while preventing the work from burning, there is known a method of forming an anoxic atmosphere by an inert gas such as argon or the like. In a method using an inert gas, an installation for inert gas replacement needs to be provided, so that the enlargement of the installation and the increase of running costs are caused. Besides, in a method of heating the work and water at the same time, it takes a long time to raise the temperature. According to the embodiment of the invention, after being carried into the heat-treating furnace, the work is immersed in the heat source solvent with high thermal conductivity to be rapidly raised in temperature. Thus, the work is efficiently raised in temperature. After that, an anoxic state is established through the formation of the superheated steam atmosphere, and the work is exposed to be subjected to the heat treatment under the superheated steam atmosphere. Thus, the work is raised in temperature in a short time, and is efficiently subjected to the heat treatment. Besides, in the case where the heat source solvent in which the work is immersed is used as a steam generation source, there is a merit that the steam atmosphere is more efficiently formed.

The heat treatment method according to the embodiment of the invention may be used for a heat-treating furnace and a heat treatment system that can realize the aforementioned steps, without being limited in particular. Examples of a heat-treating furnace and a heat treatment system that are suited for the heat treatment method according to the embodiment of the invention will be described hereinafter. However, the heat-treating furnace and heat treatment system according to the embodiment of the invention are not limited to the following examples, but may be modified in various manners unless those depart from the gist of the invention.

Figure 2:
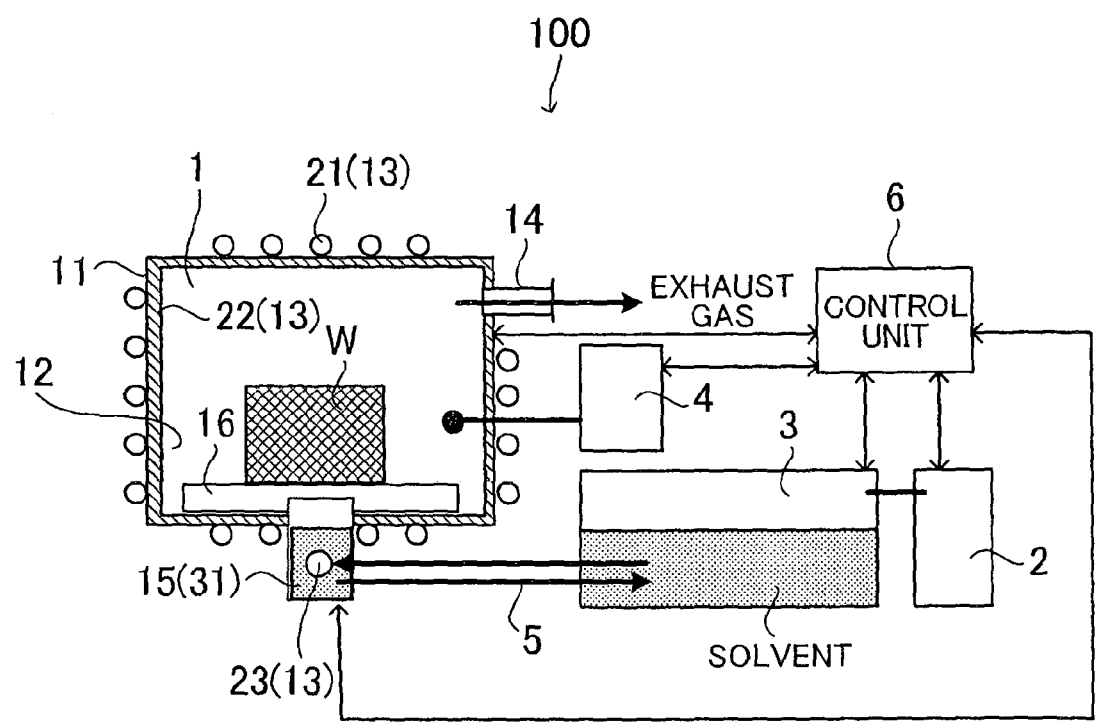
FIG. 2 is a schematic view for explaining an example of a heat treatment system according to this embodiment of the invention.

FIG. 2 is an illustration diagram showing an example of a heat treatment system 100 according to the embodiment of the invention. The heat treatment system 100 has a heat-treating furnace 1, a solvent supply device 2, a tank 3, a gas detector 4, and a control unit 6. The tank 3 may be regarded as the out-of-furnace tank of the invention.

The heat-treating furnace 1 has a housing 11, heating means 13, an exhaust port 14, solvent control means 15, and the like. The housing 11 has a space 12 that is configured to accommodate a work W to be heated. The heating means 13 is a heating source for heating the interior of the heat-treating furnace 1, and forms a superheated steam atmosphere. The gas present in the space 12 is discharged via the exhaust port 14. The solvent control means 15 is configured to immerse the work W in a heat source solvent, and is configured to expose the work W from the heat source solvent.

The solvent supply device 2 serves to control the amounts of the solvent in the tank 3 and the heat-treating furnace 1 on the basis of a command from the control unit 6. It is appropriate that the tank 3 have a capacity that makes it possible to accommodate an amount of the solvent sufficient to immerse the work W. The single tank 3 may be provided as shown in FIG. 2, or a plurality of tanks 3 may be provided. The material of the tank 3 is not limited in particular. The tank 3 may have a heat insulating material to maintain the temperature of the heated solvent. Besides, the tank 3 may be provided with heating means. In the example of FIG. 2, a polypropylene tank is used as the tank 3. The gas detector 4 is equipped with a sensor that is disposed in the heat-treating furnace 1 so as to monitor the concentration of oxygen in the heat-treating furnace 1, the gas generated from the work W and so on. The heat treatment system 100 has the control unit 6 so as to be controllable through an automation processing.

The housing 11 of the heat-treating furnace 1 is not limited in particular, but may be configured from a metal material, a ceramic material, or the like. From the viewpoint of realizing a compact body, it is preferable to provide at least part of the heating means 13 on a wall portion of the housing 11. In the heat-treating furnace 1 of FIG. 2, a heater 21 is installed outside the wall portion of the housing 11, and a far-infrared ray radiator 22 is installed on an inner wall of the housing 11. The heater 21 is not limited in particular, but for example, a plurality of heaters 21 may be installed outside the wall portion at predetermined intervals. The housing 11, the heater 21, and the far-infrared ray radiator 22 are not limited in particular, and known technologies may be utilized without limitation. In the example of FIG. 2, the far-infrared ray radiator 22 is formed by treating the surface of the housing 11, which is configured from SUS304 as a stainless steel defined by Japanese Industrial Standards, with ceramic spraying. Besides, a sheath heater is used as the heater 21.

The heat-treating furnace 1 may be provided with a work carrying portion 16 on which the work W as an object to be heated is laid. In the case where it is better to fix the work W, the work carrying portion 16 may be provided with work fixation means. Besides, in the case where the work W is small and difficult to fix, the work W may be accommodated in a case made of metallic mesh or the like, and the case made of metallic mesh or the like may be secured to the work carrying portion 16. In the example of FIG. 2, the work carrying portion 16 is provided, and the work W is installed on the work carrying portion 16. Incidentally, in the case where it is better to stir the work W according to need, it is appropriate to provide a stirring device or the like on a bottom portion of the heat-treating furnace 1 instead of providing the work carrying portion.

The heat-treating furnace 1 is provided with a work carrying-out/in portion (not shown). Besides, the heat-treating furnace 1 is configured to be able to seal gas up. In particular, the space 12 is configured to seal gas up. The heat-treating furnace 1 is provided with the exhaust port 14 for discharging the gas present in the space 12 from the housing 11. In addition, the interior of the heat-treating furnace 1 is configured such that the gas in the heat-treating furnace 1 is swiftly sucked to establish an anoxic state in forming the superheated steam atmosphere in step S3.

The gas in the heat-treating furnace 1 is monitored by detecting the concentration of oxygen in the gas through the use of the gas detector 4 connected to the heat-treating furnace 1. Besides, in the heat treatment process of step S4, the gas gasified from the work W and the like may also be monitored through the use of the gas detector 4. A plurality of gas detectors 4 may be installed, or gas detectors having different kinds of sensors may be installed according to need. In the case where only superheated steam is present, the exhaust port 14 may be configured to discharge it into the atmosphere. Alternatively, the heat treatment system 100 may be equipped with a circulation mechanism that recovers the superheated steam discharged from the exhaust port 14 to return it to the tank 3. Besides, in the case where the gas generated from the work W is a metal gas, a noxious gas, or the like, the gas is collected to a predetermined container.

In the example of FIG. 2, a solvent storage tank 31 is provided below the heat-treating furnace 1, as the solvent control means 15 for injecting the heat source solvent into the heat-treating furnace 1. The solvent storage tank 31 is continuous with the space in the heat-treating furnace 1. In the case where the work W is immersed, the space is also filled with the heat source solvent in the solvent storage tank 31. Besides, the heating means 13 is provided in the solvent storage tank 31 such that the heat source solvent can be directly heated. The configuration of the solvent control means 15 and the heating means of the solvent control means 15 are not limited in particular. In the example of FIG. 2, a flange heater is provided in the solvent storage tank 31, as a steam generation heater 23.

In the example of FIG. 2, the solvent storage tank 31 is connected to the tank 3 by a flow channel 5. The solvent is movable by driving the solvent supply device 2 in accordance with a command from the control unit 6. In addition, the tank 3 is connected to the solvent supply device 2. The solvent supply device 2 is a device for moving the solvent. For example, the solvent is moved from the tank 3 to the heat-treating furnace 1 or from the heat-treating furnace 1 to the tank 3 by making the pressure of air positive or negative. The amount of the solvent injected into the space 12 of the heat-treating furnace 1 is controlled by the control unit 6 and the solvent supply device 2. Besides, the solvent in the solvent storage tank 31 is moved to the tank 3 by the solvent supply device 2 in response to the reception of a command from the control unit 6.

Next, an exemplary method of performing the heat treatment through the use of the heat treatment system 100 of FIG. 2 will be described. In this case, an example in which water is used as the solvent will be described. First of all, the solvent supply device 2 is driven to send the water accommodated in the tank 3 to the heat-treating furnace 1. The sent water is heated by the heater 21, the far-infrared ray radiator 22, and the steam generation heater 23 in the heat-treating furnace 1, and turns into hot water at a temperature in the vicinity of 100° C.

After the water is heated to the vicinity of 100° C. in the heat-treating furnace 1, the hot water is returned into the tank 3. Subsequently, the work W is carried into the heat-treating furnace 1. The work W is laid on the work carrying portion 16. In this case, an example in which the work W consists of a plurality of lithium-ion secondary batteries will be described.

Subsequently, the hot water returned into the tank 3 is injected again into the heat-treating furnace 1 through the use of the solvent supply device 2. The amount of the hot water delivered to the heat-treating furnace 1 is set to such an amount that the work W is sufficiently immersed in the hot water. Thus, the work W is rapidly raised in temperature. At this moment, the work W is supplied with thermal energy by the heater 21, the far-infrared ray radiator 22, and the steam generation heater 23. Due to the supply of thermal energy, the interior of the heat-treating furnace 1 is saturated with superheated steam. Incidentally, the process of returning the hot water to the tank 3 may be omitted, and the lithium-ion secondary batteries as the work W may be carried into the heat-treating furnace 1 in which the heated hot water is present.

After confirming by the gas detector 4 that the superheated steam atmosphere has been sufficiently formed inside the heat-treating furnace 1, the lithium-ion secondary batteries are exposed under the superheated steam atmosphere. More specifically, the amount of hot water is adjusted such that the level of the hot water accommodated in the heat-treating furnace 1 falls to the position in the solvent storage tank 31 located below the bottom face of the heat-treating furnace 1. Then, superheated steam is supplied at a normal pressure by the steam generation heater 23. The lithium-ion secondary batteries are subjected to the heat treatment in a hybrid manner by the radiant heat from the far-infrared ray radiator 22, the heater 21, and the steam generation heater 23. Then, an electrolytic solution generated from the lithium-ion secondary batteries and gasified gas are collected via the exhaust port 14.

After a superheated steam treatment is performed, hot water is injected again into the space 12 of the heat-treating furnace 1 from the tank 3, and the work W is immersed in the hot water. Thus, the work W is rapidly cooled to a temperature in the vicinity of 100° C. Incidentally, in this case, warm water or room-temperature water may be added instead of hot water, so as to efficiently cool the work W. Besides, the hot water warmed through the cooling of the work W may be efficiently utilized to subject the subsequent work W to the treatment.

Figure 3:
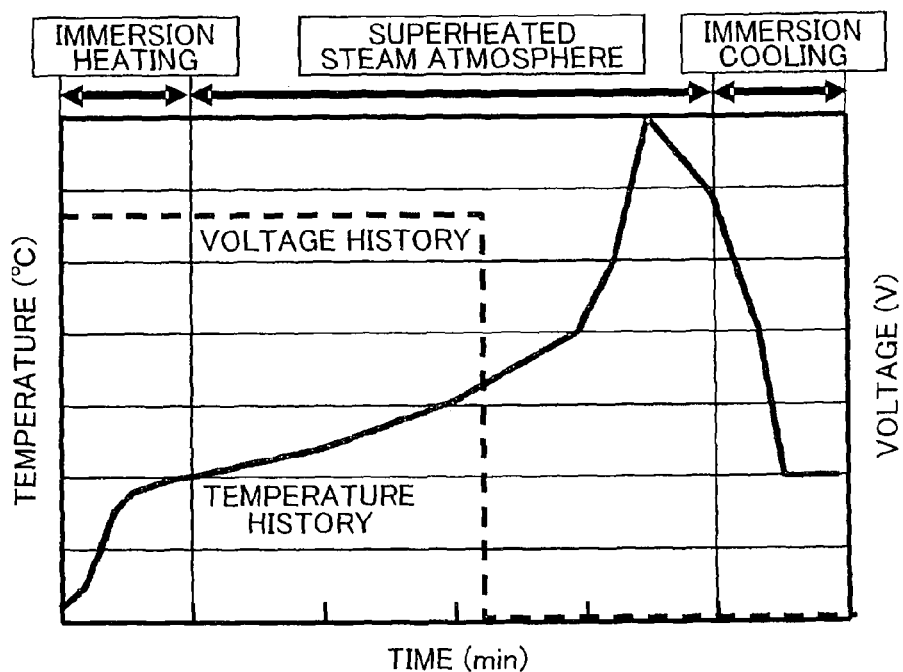
FIG. 3 is a graph that is obtained by plotting temperature and voltage with respect to heat treatment time when lithium-ion secondary batteries are subjected to a heat treatment through the use of the heat treatment system according to this embodiment of the invention.

FIG. 3 is a diagram that is obtained by plotting the temperature of the surface of each of the lithium-ion secondary batteries with respect to heat treatment time when the lithium-ion secondary batteries are subjected to the heat treatment, in the heat treatment system of FIG. 2. In FIG. 3, temperature history and voltage history are denoted by a solid line and a broken line respectively. Besides, FIG. 3 shows a diagram that is obtained by plotting the voltage of one of the lithium-ion secondary batteries with respect to heat treatment time. It is apparent from FIG. 3 that the temperature of the lithium-ion secondary battery rapidly rises in a short time through an immersion heating treatment. Besides, it is apparent that the temperature of the surface of each of the lithium-ion secondary batteries rises through a superheated steam treatment at a normal pressure. Besides, it is apparent that the work W can be cooled in an extremely short time by being immersed in hot water and subjected to a cooling treatment in a work cooling treatment process that follows the superheated steam treatment. Furthermore, it is apparent from the voltage history of FIG. 3 that the voltage of each of the lithium-ion secondary batteries becomes approximately equal to 0 V through the superheated steam treatment, and that the degradation of each of the lithium-ion secondary batteries is in progress.

Figure 4:
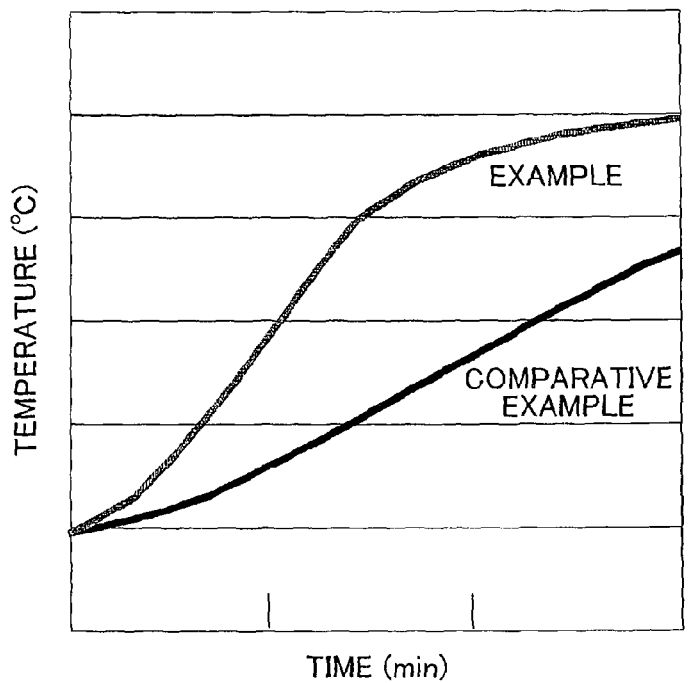
FIG. 4 is a graph that is obtained by plotting temperature with respect to heat treatment time when the lithium-ion secondary batteries are subjected to the heat treatment through the use of the heat treatment system according to this embodiment of the invention.

A result that is obtained by reviewing the effect of the immersion heating process through the use of the heat treatment system of FIG. 2 will be described. As a comparative example, the surface temperature in the case where only immersion heating was excluded among immersion heating, the heater 21, the far-infrared ray radiator 22, and the steam generation heater 23 was investigated. FIG. 4 shows a result that is obtained by plotting the temperature of the surface of each of the lithium-ion secondary batteries with respect to heat treatment time in the comparative example and the example of the invention. In the example of the invention, immersion heating, the heater 21, the far-infrared ray radiator 22, and the steam generation heater 23 are all used. It is apparent from FIG. 4 that the temperature can rise in a shorter time in the example of the invention in which immersion heating is performed, than in the comparative example in which immersion heating is not performed.

According to the heat treatment system of FIG. 2, the work is subjected to the heat treatment through the use of the solvent (water) with high thermal conductivity, and hence can be rapidly raised in temperature. Besides, in the case where a mechanism that forms a superheated steam atmosphere in the heat-treating furnace is provided as in the example of FIG. 2, there is no need to separately provide a special replacement installation for forming an anoxic atmosphere. Namely, a superheated steam atmosphere can be formed without using a bulky device such as a boiler or the like. Moreover, since the superheated steam atmosphere is formed by heating hot water, it is possible to obtain the steam atmosphere in a short time. Incidentally, a boiler or the like may be used together in accordance with the intended purpose.

Furthermore, according to the heat treatment system of FIG. 2, since the hot water used to raise the temperature of the work is reutilized to cool the work, the work can be efficiently cooled. Accordingly, the heat treatment of the work can be realized in a short time. Furthermore, according to the example of FIG. 2, far-infrared ray heating is used together to perform heating in a hybrid manner. Therefore, a high-speed heat treatment can be more effectively realized.

Namely, according to the heat treatment system of FIG. 2, hybrid heating methods including three heating methods, that is, (i) immersion heating by the heat source solvent (water), (ii) the heat treatment by superheated steam at normal pressure, and (iii) far-infrared ray heating are utilized. Therefore, the work can be subjected to the heat treatment at high speed. By performing the heat treatment at high speed, the saving of energy is achieved, and the environmental burden is reduced. Thus, the reduction of cost is achieved. Furthermore, the absence of a boiler serves to achieve reduction in size. For example, the heat treatment system may be available in the layout of a container size of 20 ft (6.096 m) to achieve reduction of the size of the devise. Besides, there is a merit that the same medium makes it possible to perform immersion heating and cooling, and form an anoxic atmosphere. Furthermore, the heat treatment of the work may be automated.

Flammable substances such as resin, electrolytic solution, and the like are contained in each of the lithium-ion secondary batteries. However, according to the heat treatment method of the embodiment of the invention, the heat treatment is performed in an anoxic state. Therefore, these substances can be treated without being burned. Furthermore, there is a merit that hydrogen fluoride as a noxious substance in the electrolyte is soluble in water. Accordingly, there is also a merit that the collecting of hydrogen fluoride is facilitated by using water as the medium. Incidentally, the heat source solvent can be circulated to be utilized many times. However, it is also appropriate to provide a purification system for filtering or the like, depending on the state of contamination.

The invention claimed is:

1. A heat treatment method for subjecting a work to a heat treatment in a heat-treating furnace, comprising:
   carrying the work into the heat-treating furnace;
   immersing the work in the heat-treating furnace in a heat source solvent that is heated before the immersing;
   forming a superheated steam atmosphere in the heat-treating furnace;
   exposing the work in the heat-treating furnace under the superheated steam atmosphere; and
   carrying the work out of the heat-treating furnace.

2. The heat treatment method according to claim 1, wherein
   the heat source solvent is water, or a solvent containing water.

3. The heat treatment method according to claim 2, wherein
   the superheated steam atmosphere is formed from the heat source solvent by further heating the heat source solvent after the work is immersed in the heat source solvent.

4. The heat treatment method according to claim 1, wherein
   the work is exposed under the superheated steam atmosphere after being immersed in the heat source solvent.

5. The heat treatment method according to claim 1, wherein
   the superheated steam atmosphere is formed in the heat-treating furnace while the work is immersed in the heat source solvent.

6. The heat treatment method according to claim 1, further comprising
   immersing the work in the heat source solvent to cool the work before carrying the work out of the heat-treating furnace and after exposing the work under the superheated steam atmosphere.

7. The heat treatment method according to claim 1, further comprising
   heating the work by far-infrared rays.

8. The heat treatment method according to claim 1, wherein
   the work is a lithium-ion secondary battery.

9. A heat-treating furnace for subjecting a work to a heat treatment, the heat-treating furnace being connected to a solvent supply device that is configured to supply a heat source solvent into the heat-treating furnace,
   the heat-treating furnace comprising:
   a housing that is configured to accommodate the work and is equipped with a space, the space being configured to seal gas;
   a heating unit that is configured to heat the heat source solvent to fill the space with a superheated steam;
   an exhaust port that is connected to the housing and is configured to discharge gas present in the space from the housing; and
   a solvent control unit that is configured to immerse the work in the heat source solvent heated by the heating unit and to expose, when the space is filled with the superheated steam, the work from the heat source solvent.

10. The heat-treating furnace according to claim 9, wherein
    the heat source solvent is water, or a solvent containing water.

11. The heat-treating furnace according to claim 10, wherein
    the heating unit includes a steam generation heater,
    the solvent control unit includes a solvent storage tank that is configured to store the heat source solvent, and
    the steam generation heater heats the heat source solvent stored in the solvent storage tank to generate steam from the heat source solvent.

12. The heat-treating furnace according to claim 9, wherein
    the heating unit further includes a far-infrared ray radiation unit.

13. The heat-treating furnace according to claim 9, wherein
    the heat-treating furnace is connected to a gas detector that is configured to detect that an interior of the heat-treating furnace has become a superheated steam atmosphere.

14. A heat treatment system comprising:
    a heat-treating furnace that includes a housing, a solvent storage tank and a steam generation heater, wherein the housing is configured to accommodate a work, the solvent storage tank is configured to store a heat source solvent containing water, and the steam generation heater is configured to heat the heat source solvent stored in the solvent storage tank to generate steam in the housing;
    an out-of-furnace tank that is provided outside the heat-treating furnace and is connected to the solvent storage tank by a flow channel; and
    a solvent supply device that is configured to move the heat source solvent between the out-of-furnace tank and the solvent storage tank via the flow channel to immerse the work in the heat source solvent or expose the work from the heat source solvent.

* * * * *